United States Patent
Yang et al.

(12) 
(10) Patent No.: US 6,516,635 B1
(45) Date of Patent: Feb. 11, 2003

(54) APPARATUS AND METHOD FOR MAKING A JOINT-FREE MACH-ZEHNDER INTERFEROMETER

(75) Inventors: Yawen Yang, Newark, CA (US); Tzong-Shinn Jiang, San Jose, CA (US)

(73) Assignee: Tera Fiberoptics, Inc., Fremont, CA (US)

( * ) Notice: Subject to any disclaimer, the term of this patent is extended or adjusted under 35 U.S.C. 154(b) by 271 days.

(21) Appl. No.: 09/699,189

(22) Filed: Oct. 26, 2000

(51) Int. Cl.⁷ ............................................. C03B 37/07
(52) U.S. Cl. ............................ 65/378; 65/501; 65/411; 65/485; 356/378
(58) Field of Search .......................... 65/411, 378, 485, 65/501; 356/478

(56) References Cited

U.S. PATENT DOCUMENTS

| | | | |
|---|---|---|---|
| 5,408,555 A | * 4/1995 | Fielding et al. ................ | 385/11 |
| 6,112,555 A | * 9/2000 | Bloom ........................... | 65/378 |
| 6,169,830 B1 | * 1/2001 | Kewitsch et al. .............. | 385/37 |
| 6,289,699 B1 | * 9/2001 | Kewitsch et al. .............. | 264/1.25 |

* cited by examiner

Primary Examiner—John Hoffmann
(74) Attorney, Agent, or Firm—John F. Schipper

(57) ABSTRACT

Method and system for constructing and testing integrity of a combination of first and second spaced apart optical fiber couplers that each receive and hold two fibers. A segment of each fiber in a separation region between the couplers is heated, twisted and elongated by selected amounts to form a fiber complex, located between the first and second couplers. The fibers in the second coupler are subjected to further controlled elongation. A spectrum analyzer receives a common light beam passed through each of the two fibers and fiber couplers and measures successive maximum and minimum values of an interferometric variable IF and pit-to-pit or peak-to-peak spacing of the IF values as fiber segment elongation is varied. If (1) successive maximum values lie within an envelope of selected (small) width, (2) differences between successive maximum and minimum values are at least equal to a selected threshold value, and (3) pit-to-pit or peak-to-peak spacing is close to a selected spacing standard, the combination is accepted as part of a Mach-Zehnder-type interferometer.

26 Claims, 4 Drawing Sheets

APPARATUS AND METHOD FOR MAKING A JOINT-FREE MACH-ZEHNDER INTERFEROMETER

FIELD OF THE INVENTION

This invention relates to testing of an optical fiber coupler for use in wavelength division multiplexing.

BACKGROUND OF THE INVENTION

Mach-Zehnder-type interferometers ("MZIs") have recently been applied to dense wavelength division multiplexing (DWDM), which may be defined as a WDM system in which a single mode optical fiber is altered to carry at least 16 signals with spaced apart carrier frequencies. WDM and DWDM systems are discussed in the context of increasing signal density requirements by J. Hecht in "Wavelength Division Multiplexing", Technology Review, March–April 1999, pp. 73–78., and by P. Fairley in "The Microphotonics Revolution", Technology Review, July–August 2000, pp. 38–44. An MZI DWDM is conventionally implemented by connecting two 3 dB couplers having different lengths to two interferometer arms to create a controllable phase difference for the two arms. A common method for connecting the two arms is splicing, which offers an advantage of using qualified and well tested 3 dB couplers to create the same optical isolation at the output terminals. Major disadvantages of the splicing approach are (1) an uncertainty in signal insertion loss and (2) a tendency for a fiber to break near the splicing location.

What is needed is an approach for fabricating, connecting and testing the arms of an interferometer device that avoids or minimizes these problems and allows use of indirect standards to evaluate the connection. Preferably, the approach should work with already-available test equipment and should provide an unambiguous and quantitative test for acceptance. Preferably, the approach should be usable for two or more couplers in series.

SUMMARY OF THE INVENTION

These needs are met by the invention, which provides first and second 3 dB optical couplers, spaced apart by 35–45 mm, for two fibers. A fiber complex including a segment from each fiber is formed, using heating, twisting and elongation. The fiber complex controllably couples light from one fiber into the other fiber and is positioned between the first and second couplers. Coupling in the first fiber coupler and fiber complex may be tested in isolation, using a common light beam propagating in the two fibers. Fiber segments in the second coupler are elongated, and successive maximum and minimum values of an interferometric variable are measured by an optical spectrum analyzer as elongation proceeds. If (1) successive maxima lie within an envelope of selected small width, (2) the difference in amplitudes between successive maximum and minimum values is at least equal to a selected threshold difference and (3) pit-to-pit spacing (or peak-to-peak spacing) is close to a specified channel spacing, the combination is accepted for use in an interferometer.

DESCRIPTION OF BEST MODES OF THE INVENTION

Figure 1:
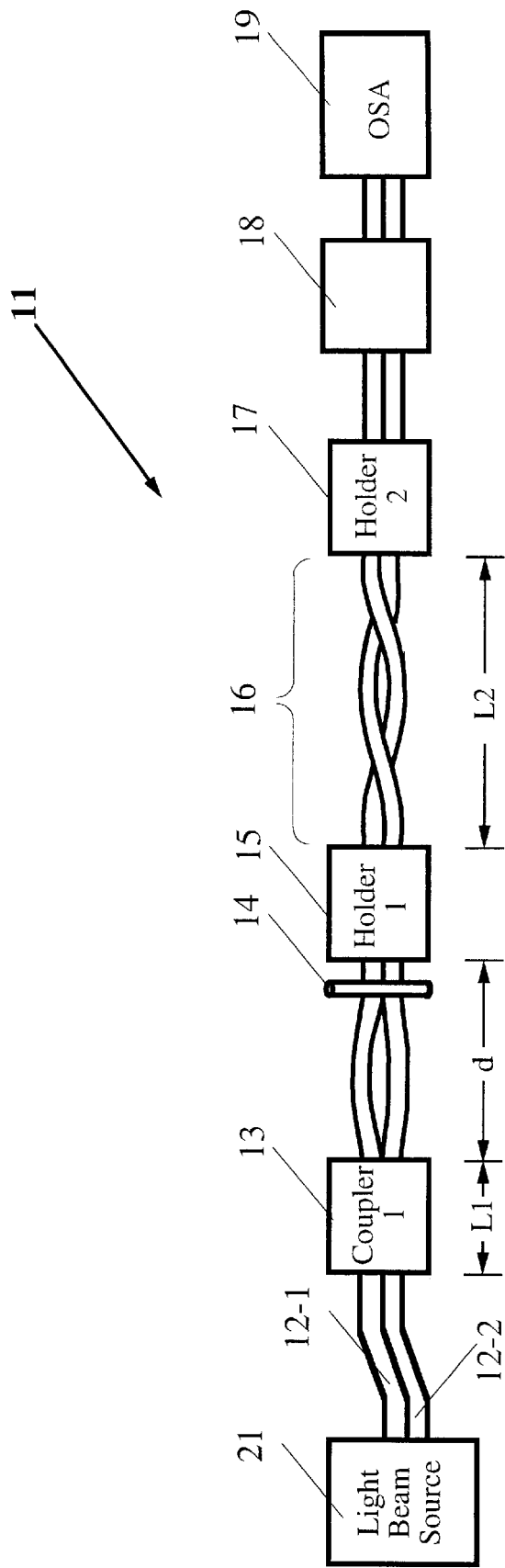
FIG. 1 is a schematic view illustrating a system for practicing the invention.

FIG. 1 illustrates a system 11 for practice of the invention. First and second optical fibers, 12-1 and 12-2, are received by a first coupler 13A, by a fiber alignment mechanism 14, by a first holder or clamp 15, by a second holder or clamp 17 and by an optional positioner 18, spaced apart as shown. A fusion region 16 of selected length d=10–45 mm lies between the first holder 15 and the second holder 17. In the fusion region 16, the first and second optical fibers, 12-1 and 12-2, are twisted by a selected amount and are heated to encourage the two fibers to fuse and form, effectively, a second coupler. The first and second holders, 15 and 17, grip and twist the two fibers, 12-1 and 12-2, to elongate and/or rotate the fibers. The two fibers, 12-1 and 12-2, extend beyond the second holder 17 and positioner 18 and are received at an optical spectrum analyzer (OSA) 19. The OSA 19 is configured to analyze interference patterns and one or more interferometric variables associated with a quasi-monochromatic light beam, produced by a common source 21, that propagates within each fiber.

After the two fibers, 12-1 and 12-2, are received and held by the first coupler 13, a segment of selected length d≈10–45 mm (or longer, if desired) in the fusion region 16 of each of the two fibers is aligned, using the fiber alignment mechanism 14 and the first and second holders, 15 and 17, and is prepared for processing in the fusion region: (1) a protective coating of a segment of each fiber is optionally removed; (2) each fiber segment is heated to a selected temperature T1 in the range 850° C.$\leq$T$\leq$1150° C. for a selected first heating time interval of length $\Delta t1$(heat)=2–4 sec; (3) the two fiber segments are twisted around each other by a selected twist angle $\Delta q$ (360° $\leq \Delta\theta \leq$1080°) for a selected twist time interval of length $\Delta t$(twist)=1–5 sec; and (4) the two fiber segments are elongated together over an elongation range of 0–7000 $\mu$m (or higher if desired) for a selected first elongation time interval of length $\Delta t1$(elong)=1–10 sec. This produces a fiber complex that is elongated and twisted. The two fiber segments are received and held in the second holder 17 and the positioner 18.

A coupling ratio CR1 can be determined directly for the first coupler 13. However, the arrangement shown in FIG. 1 does not permit a direct determination of the coupling ratio for the second coupling (fusion) region 16 so that the second coupling ratio must be determined indirectly, if at all. The lengths L1 and L2 of the fiber segments in the respective coupling regions, 13 and 16, should be at least equal to a minimum length $L_{min}$ required to provide adequate coupling of the contiguous segments of the two fibers, 12-1 and 12-2. This minimum coupling length $L_{min}$ may be as short as 10 mm.

The segment length of each of the two fibers, 12-1 and 12-2, in one of the couplers, 13 for definiteness, is held fixed, and the two fiber segments in the other second coupling (fusion) region 16 are subjected to a controllable longitudinal pulling force F within this coupling region. As the pulling force F increases in magnitude and the elongations $\epsilon$-i (i=1, 2) of the two fiber segments in the second coupling (fusion) region 16 increase, the fraction of power coupled into one fiber 12-1 or into the other fiber 12-2 in the second coupling (fusion) region 16 will oscillate between 0.0 and 1.0 (or between a pair of numbers with a smaller range within the interval 0.0 and 1.0).

Figure 2:
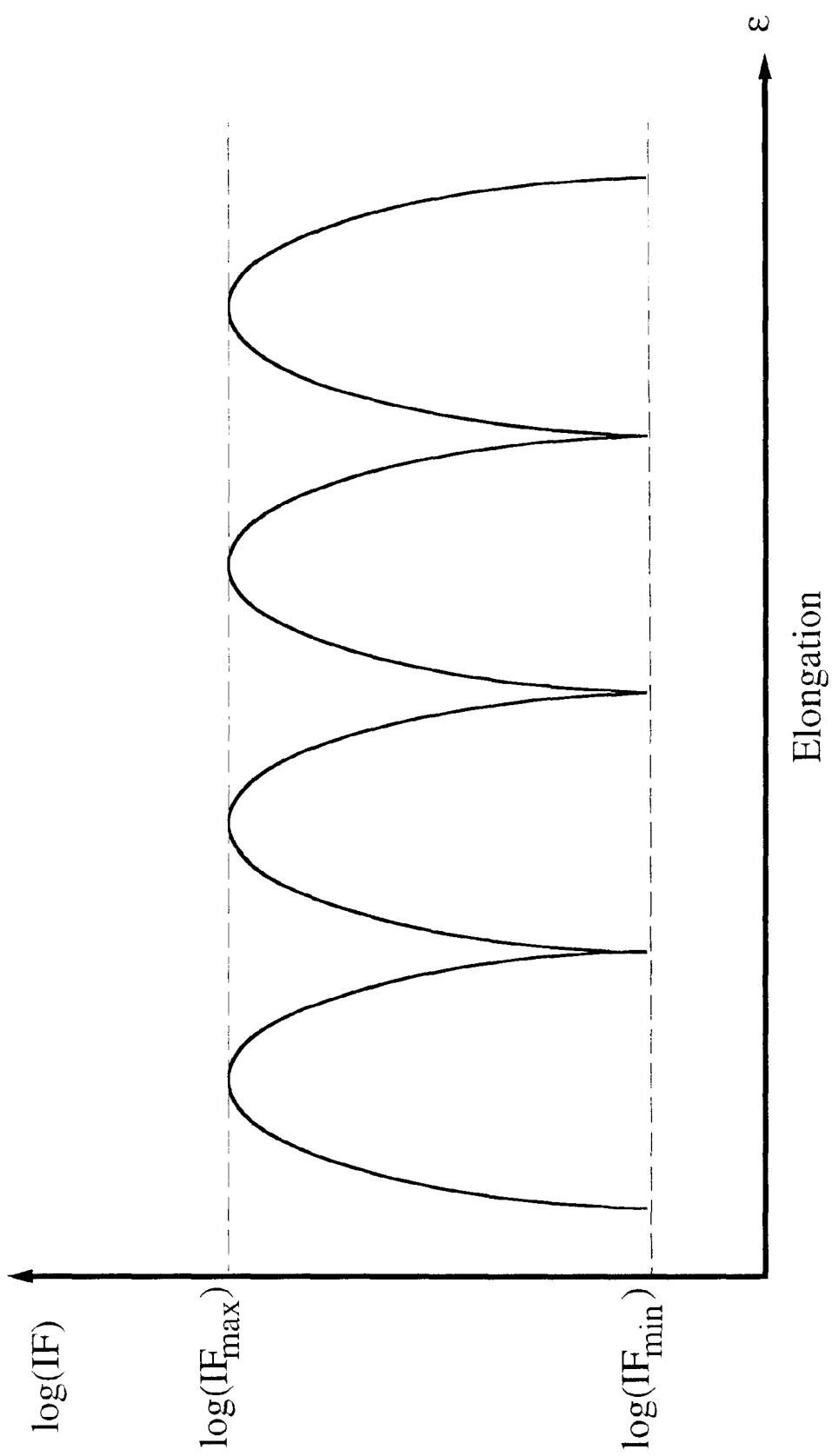
FIG. 2 is a graphical view representing power coupling into one of two coupled fibers, based on interferometric measurements.

As the elongation e-i for each fiber, 12-1 and 12-2. in the second coupling (fusion) region 16 increases, the logarithm of a measured interferometric variable IF for a particular fiber will pass through a sequence of peaks or maxima (of amplitude log($IF_{max}$)) and a sequence of pits or minima (of amplitude log($IF_{min}$)) having a difference that is roughly constant, due in part to the varying interferometric effects of a quasi-monochromatic light beam propagating within the two fibers. This is illustrated graphically in FIG. 2. When (1) the peak value log($IF_{max}$) varies within an envelope having a selected threshold width (preferably no larger than about 0.5 dB), (2) the peak-to-pit difference log($IF_{max}/IF_{min}$) is at least equal to a selected threshold difference of about 18 dB (preferably at least 20 dB), and (3) the pit-to-pit, or distance from one pit location to the next consecutive pit location is approximately equal to a specified channel spacing (1.6 nm, 3.2 nm, 6.4 nm, 12.8 nm), the combined system of the two fibers 13-i (i=1, 2) and the two spaced apart coupling regions, 13 and 16, is accepted. Optionally, the combination is rejected if at least one of the conditions (1), (2) and (3) is not satisfied.

Figure 3A:
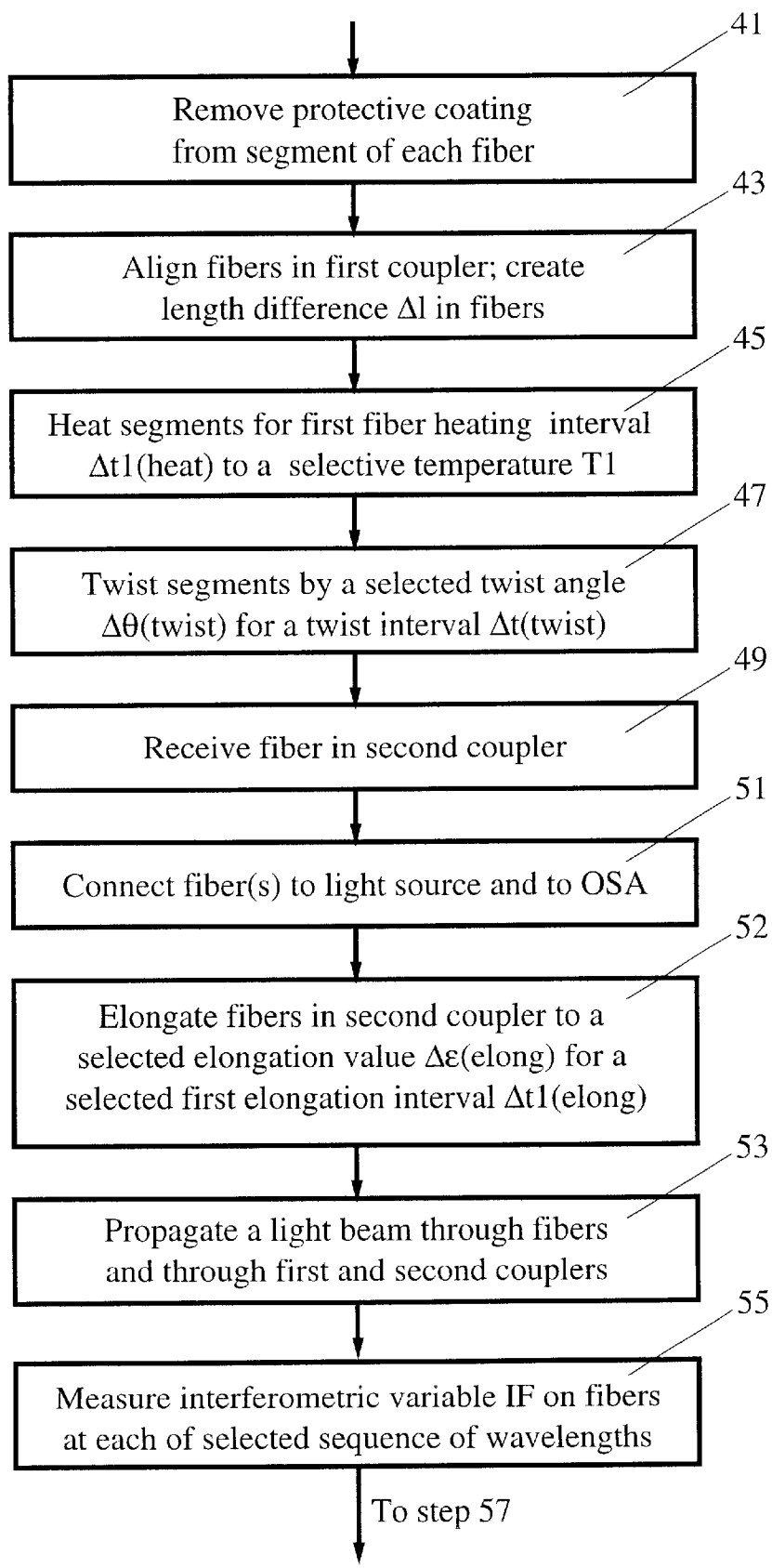
FIGS. 3A and 3B are flow charts of methods for practicing the invention.
Figure 3B:
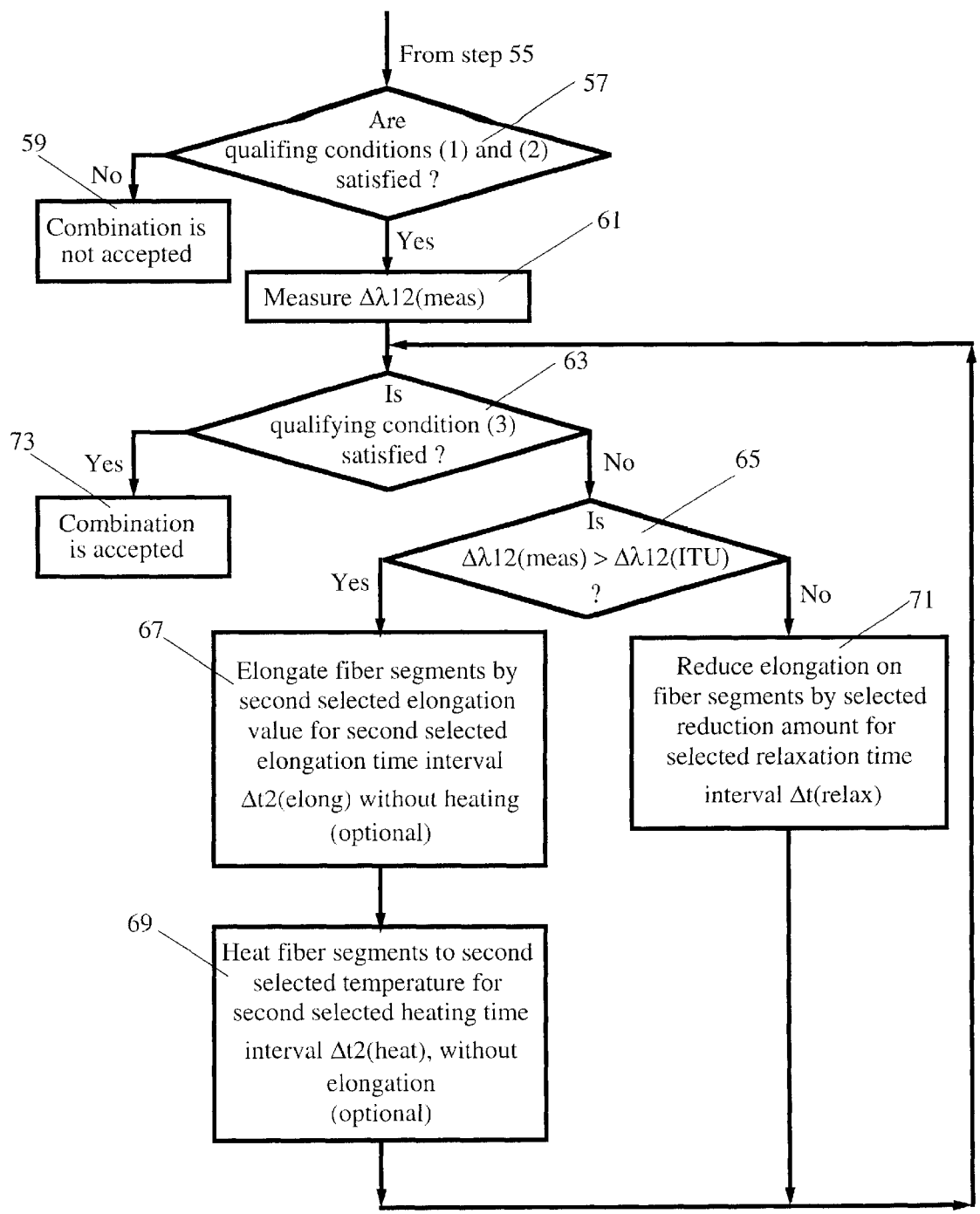

FIGS. 3A and 3B are a flow chart illustrating a procedure for practicing the invention. In step 41, a protective coating for the segment for a segment of each of two fibers is removed. In a first step 43, the two fibers are brought together in a first fiber coupler, and one fiber is elongated a selected amount Δs (e.g., Δs≈1000 μm) relative to the other fiber. In step 45, the segments are heated for a first heating interval of selected length Δt1(heat)=2–4 sec. In step 47, the fiber segments are twisted around each other with a selected twist angle Δq(twist)=360°–1080° for a twist interval having a selected length Δt(twist)=1–5 sec. In step 49, the fiber segments are received and held in a second fiber coupling region.

In step 51, a light source is connected to a first end of each fiber and an optical spectrum analyzer is connected to a second end of each fiber. In step 52, the fiber segments are elongated by a selected elongation amount (e.g., Δe=7000–10000 μm) over a first elongation interval of selected length Δt1(elong)=1–10 sec. In step 53, a quasi-monochromatic light beam is propagated through each of the two fibers and through the first and second couplers. In step 55, an interferometric variable IF (e.g., optical isolation) is measured for the two fibers at each of a selected sequence of two or more wavelengths in a selected wavelength range. In step 57, the system determines if each of two qualifying conditions is satisfied: (1) the maxima of the interferometric variable IF are within an envelope, having a selected threshold width and surrounding a selected maximum amplitude value, as fiber elongation is varied; (2) the peak-to-pit difference of the interferometric variable IF is at least equal to a threshold minimum difference. If the answer to the query in step 57 is "no," because one or both of the conditions (1) and (2) is not satisfied, the system moves. to step 59 and does not accept the combination for use in an interferometer.

If the answer to the query in step 57 is "yes," the system moves to step 61 and measures a wavelength difference Δλ12(meas) corresponding to consecutive pit-to-pit (or peak-to-peak) spacing. The International Telecommunications Union (ITU) has proposed some pit-to-pit spacing standards, λ1(s)–λ2(s)=Δλ12(s) (e.g., 0.8, 1.6 and 3.2 nm). The pit-to-pit spacing Δλ12(meas) is measured and compared with Δλ12(s) in step 61. In a typical situation, the pit-to-pit spacing Δλ12(meas) will be greater than the ITU spacing standard Δλ12(s).

The system determines, in step 63, if a qualifying condition (3) is satisfied: Is the pit-to-pit (or peak-to-peak) spacing, as measured by the wavelength difference between two adjacent pits (or by the wavelength difference between two adjacent peaks) approximately equal to a selected channel spacing (within a threshold difference). If the answer to the query in step 63 is "yes," the system moves to step 73 and accepts the combination of first and second fiber couplers.

If the answer to the query in step 63 is "no," the system determines, in step 65, if Δλ12(meas)>Δλ12(s). If the answer to the query in step 65 is "yes," the system moves to step 67 (optional) and executes elongation (by a selected small amount) without heating over a second elongation time interval having a selected temporal length Δt2(elong) (e.g., 0.1–0.3 sec ), in order to move the pit-to-pit measured spacing Δ1(meas) toward the lower value Δλ112(s). The step 67 may be repeated as required to move the pit-to-pit measured wavelength spacing Δλ12(meas) closer to the specified value Δλ12(s). Steps 65, 67, 69 and 71 may also be applied to compare, instead, peak-to-peak measured wavelength spacing with a specified channel spacing.

If Δλ12(meas)>Δλ12(s), the system moves to step 69 (optional) and executes heating to a second temperature T2≈T1 without elongation over a second heating time interval having a selected temporal length Δt2(heat) (e.g., 0.1–0.3 sec), in order to move the pit-to-pit measured spacing Δλ12(meas) toward the lower value Δλ12(s). At least one of steps 67 and 69 is executed at least once if Δλ12(meas)>Δλ12(s), and both steps may be executed, as a pair, and repeated. The order of application of the steps 67 and 69 may be reversed, if desired. After steps 67 and 69, the system moves to step 61, (re)measures the pit-to-pit measured spacing, and moves to step 63 and repeats the cycle.

If the answer to the query in step 65 is "no," the system moves to step 71, where gripping devices for the first and second fiber couplers are moved toward each other by a small amount, without heating, over a relaxation time interval having a selected temporal length Δt(relax) in a selected range (e.g., 0.1–0.3 sec). This increases the measured pit-to-pit spacing Δλ12(meas) toward the desired higher value Δλ12(s). One or both of the steps 67 and 69 can be applied to move the pit-to-pit measured spacing Δλ12(meas) toward lower values, if needed, if the step 71 raises the measured spacing Δλ12(meas) above the desired value Δλ12(s). The system then moves to step 61, (re)measures the pit-to-pit measured spacing, and moves to step 63 and repeats the cycle. Proceeding in this manner, the pit-to-pit measured spacing is adjusted to agree, within accepted tolerances, with the required spacing standard Δλ12(s). The system then moves to step 73.

When two fiber couplers are combined in a spaced apart configuration, as in FIG. 1, a direct measure of coupling at the second coupler is difficult or impossible. The invention provides an indirect measure of coupling, using interferometric effects to determine whether the second fiber coupler is acceptable. This indirect approach can also be used to evaluate fiber couplers number n=2, 3, . . . , N (N≧3) in a sequence of N spaced apart fiber couplers.

The roles of the first and second fiber couplers, 15A and 15B may be reversed, in an alternative embodiment.

The separation distance d between the first and second fiber couplers may be as small as 10 mm and may be as large as desired, consistent with practical requirements for the test bed and the resulting interferometer.

What is claimed is:

1. A method for forming a combination of two optical fiber couplers, the method comprising:

providing a fiber complex that physically couples first and second optical fibers;

aligning the two fibers in a first fiber coupler and in a second fiber coupler, spaced apart by a selected separation distance, with the fiber complex therebetween;

propagating a light beam having a selected wavelength component within the first and second fibers;

varying a light beam wavelength within the wavelength component and measuring successive maximum and minimum values of a selected interferometric variable IF associated with the two fibers, as the wavelength component is varied; and when (1) the successive maximum values fall within an envelope having a selected threshold width that includes a reference maximum value and (2) the successive maximum and minimum values differ by at least a first selected threshold difference, interpreting occurrence of these conditions as indicating that the combination of the first and second couplers is acceptable.

2. The method of claim 1, further comprising selecting said interferometric variable to be optical isolation of said first fiber relative to said second fiber.

3. The method of claim 1, further comprising:
when at least one of said conditions, (1) said successive maximum values fall within an envelope having said selected threshold width and (2) said successive maximum and minimum values differ by at least said first selected threshold difference, is not satisfied, interpreting occurrence of these conditions as indicating that the combination of the first and second couplers is not acceptable.

4. The method of claim 1, further comprising:
comparing a first difference of wavelength values, corresponding to two consecutive maximum IF values or corresponding to two consecutive minimum IF values, with a second selected wavelength difference.

5. The method of claim 4, further comprising:
when said first wavelength difference and said second wavelength difference differ by no more than a second selected threshold difference, interpreting occurrence of this condition as indicating that the combination of said first and second couplers may be acceptable.

6. The method of claim 5, further comprising:
when said first wavelength difference is greater than said second wavelength difference by more than said second selected threshold difference, taking at least one of the following actions:
(i) heating said fiber complex to a selected temperature for a selected heating time interval without further elongation; and
(ii) elongating said fiber complex to a second selected elongation value for a selected elongation time interval without further heating.

7. The method of claim 5, further comprising:
when said first wavelength difference is less than said second wavelength difference by more than said second selected threshold difference, reducing said elongation in said fiber complex by a selected amount.

8. The method of claim 1, further comprising choosing said separation distance to lie in a range 35–45 mm.

9. The method of claim 1, further comprising choosing said first fiber coupler to precede said second fiber coupler.

10. The method of claim 1, further comprising choosing said second fiber coupler to precede said first fiber coupler.

11. The method of claim 1, further comprising choosing said threshold width to be no more than 0.5 dB.

12. The method of claim 1, further comprising choosing said threshold difference to be no less than 18 dB.

13. The method of claim 1, wherein said process of providing said fiber complex further comprises:
removing a protective coating from a selected portion of said fibers to provide an unprotected portion of each of said fibers;
elongating said first fiber relative to said second fiber by a selected elongation amount;
heating the unprotected portion of said optical fibers to a selected temperature for a selected complex heating time interval;
twisting the unprotected portion of said fibers by a selected twist angle for a selected complex twisting time interval; and
elongating said fibers by a selected fiber complex elongation amount for a selected fiber complex elongation time interval.

14. A system for forming a combination of two optical fiber couplers, the system comprising:
a first fiber coupler and a second fiber coupler, spaced apart by a selected separation distance, that together receive and align a fiber complex that physically couples first and second optical fibers;
a light source that provides a light beam having a variable wavelength and that is connectable to a first end of each fiber;
a spectrum analyzer, connectable to a second end of each fiber, that receives and compares a light beam from each fiber and varies the wavelength, including measurement of a local maximum value and a local minimum value of a selected interferometric variable IF as the wavelength component is varied, where the spectrum analyzer determines whether: (1) the successive maximum values of IF fall within an envelope having a selected threshold width that includes a reference maximum value and (2) the successive maximum and minimum values of IF differ by at least a first selected threshold difference, and interprets occurrence of both of these conditions as indicating that the combination of the first and second couplers is acceptable.

15. The system of claim 14, wherein said interferometric variable is selected to be optical isolation of said first fiber relative to said second fiber.

16. The system of claim 14, wherein:
when at least one of said conditions, (1) said successive maximum values fall within an envelope having said selected threshold width and (2) said successive maximum and minimum values differ by at least said first selected threshold difference, is not satisfied, said system interprets occurrence of these conditions as indicating that the combination of the first and second couplers is not acceptable.

17. The system of claim 14, wherein said analyzer compares a first difference of wavelength values, corresponding to two consecutive maximum IF values or corresponding to two consecutive minimum IF values, with a second selected wavelength difference.

18. The system of claim 17, wherein, when said first wavelength difference and said second wavelength difference differ by no more than a second selected threshold difference, said system interprets occurrence of this condition as indicating that the combination of said first and second couplers may be acceptable.

19. The system of claim 18, wherein, when said first wavelength difference is greater than said second wavelength difference differ by more than said second selected threshold difference, said system takes at least one of the following actions:
  (i) heating said fiber complex to a selected temperature for a selected heating time interval without further elongation; and
  (ii) elongating said fiber complex to a second selected elongation value for a selected elongation time interval without further heating.

20. The system of claim 18, wherein, when said first wavelength difference is less than said second wavelength difference differ by more than said second selected threshold difference, said system reduces said elongation in said fiber complex by a selected amount.

21. The system of claim 14, wherein said separation distance is chosen to lie in a range 35–45 mm.

22. The system of claim 14, wherein said first fiber coupler precedes said second fiber coupler.

23. The system of claim 14, wherein said second fiber coupler precedes said first fiber coupler.

24. The system of claim 14, wherein said threshold width is chosen to be no more than 0.5 dB.

25. The system of claim 14, wherein said threshold difference is chosen to be no less than 18 dB.

26. The system of claim 14, wherein said fiber complex is provided by:
  removing a protective coating from a selected portion of said fibers to provide an unprotected portion of each of said fibers;
  elongating said first fiber relative to said second fiber by a selected elongation amount;
  heating the unprotected portion of said optical fibers to a selected temperature for a selected complex heating time interval;
  twisting the unprotected portion of said fibers by a selected twist angle for a selected complex twisting time interval; and
  elongating said fibers by a selected fiber complex elongation amount for a selected fiber complex elongation time interval.

* * * * *